June 1, 1937.  A. B. RYPINSKI  2,082,122
DISTRIBUTION SYSTEM
Filed Nov. 24, 1933  2 Sheets-Sheet 1
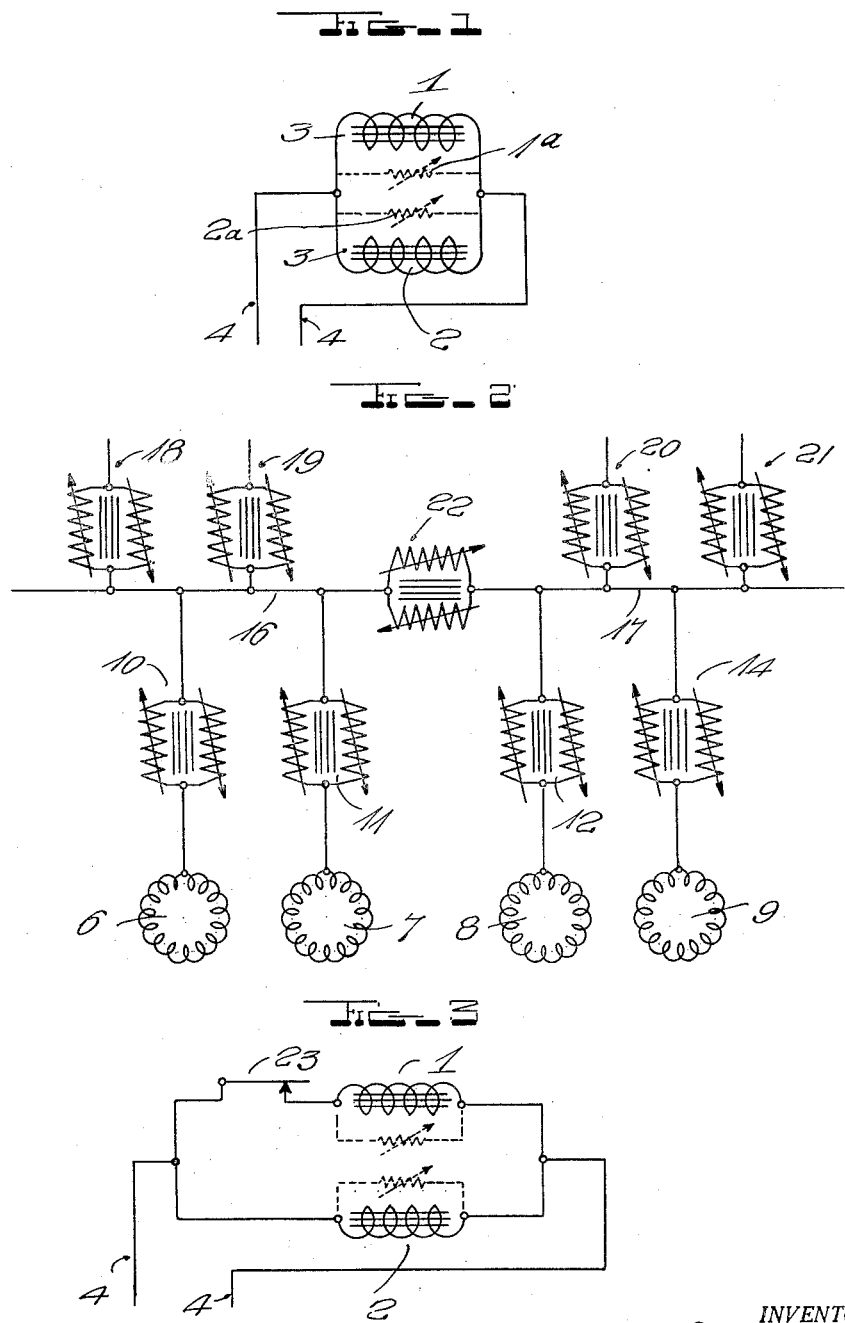
INVENTOR.
Albert B. Rypinski,
BY John B. Brady
ATTORNEY.

June 1, 1937.  A. B. RYPINSKI  2,082,122
DISTRIBUTION SYSTEM
Filed Nov. 24, 1933  2 Sheets-Sheet 2
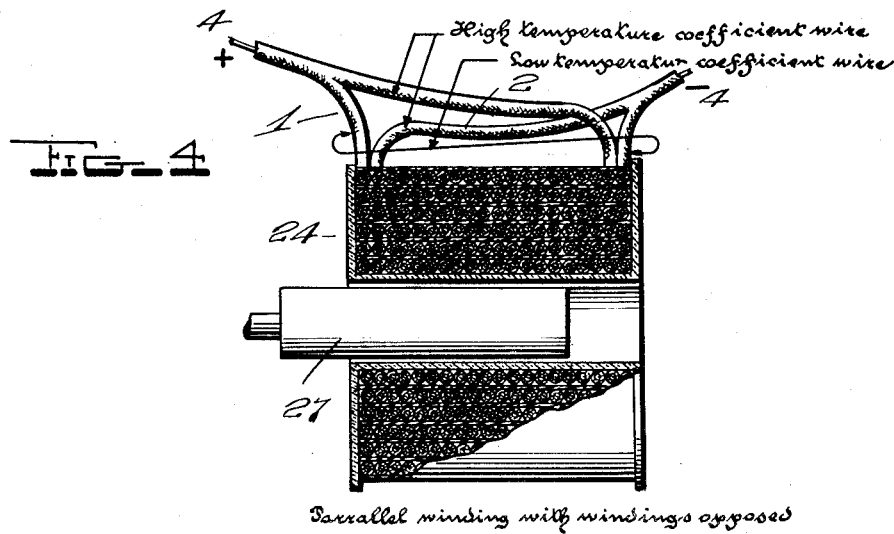
Parrallel winding with windings opposed
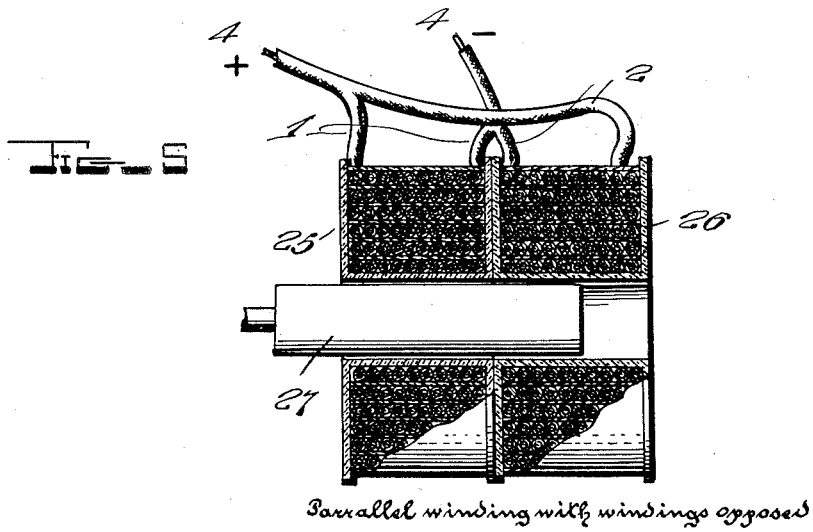
Parrallel winding with windings opposed
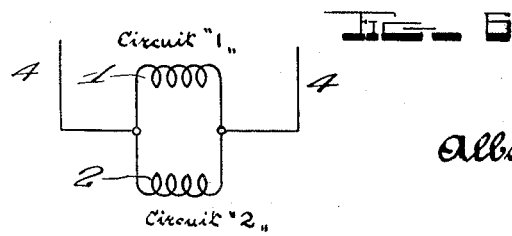
INVENTOR.
Albert B. Rypinski,
BY John B. Brady
ATTORNEY.

Patented June 1, 1937

2,082,122

UNITED STATES PATENT OFFICE 2,082,122

DISTRIBUTION SYSTEM

Albert B. Rypinski, Laurelton, N. Y.

Application November 24, 1933, Serial No. 699,619

26 Claims. (Cl. 171—242)

This application is a continuation-in-part of my application Serial Number 416,877, for Slow electromagnetic regulating devices, filed December 27, 1929.

Application Serial No. 416,877 is directed to an electromagnetic regulating device per se in its various modifications as electromagnet, reactor, transformer or combinations of these elements. This application is directed to the use of these devices in a power distribution system to control and limit abnormal or short circuit currents in the several parts of said system.

Under "uses for the invention" application Ser. No. 416,877 states:

In reactance coils of the air or iron core types which are used to limit short circuit currents in a power system, the coils must be sufficiently sturdy to meet short circuit strains. These reactances carry from twenty to thirty-three times full load current under conditions of short circuit, and unless a large amount of iron is used, the coils will be saturated long before these maximum values are reached. I may employ a set of opposed equal windings according to my invention herein in a power circuit and there will be no magnetic field at full load. Under short circuit conditions, however, heating will rapidly occur and the unbalance will set up a flux which may saturate a suitable core, the reactor being much more compact, stronger, and having less losses than reactors heretofore employed. Reactance coils or magnetic resistances are in general use today, but they are all practically instantaneous in their action, that is, the magnetism and the current appear simultaneously. If time has to be introduced it requires auxiliary apparatus such as time relays, switches, etc.

With my magnetic resistances composed of differential-thermal coils, time of operation is introduced directly as an automatic function. By using windings of very small cross-sections in proportion to the current to be carried and designing for high temperatures, the time may be made very short. By using relatively large cross-sections in proportion to the current and holding the heat in as illustrated in Fig. 4, the time may be made very long. (Fig. 4 refers to application 416,877.)

In addition to motor starters with magnetic resistance mentioned above, reactance coils for large power networks are an important application. These are employed to limit the amount of energy flowing into a fault, to reduce strains on switches and generators, and to give selective equipment time to function.

Assume, for example, a network of power stations in New York city, connected through a 100,000 volt line to a network of power stations around Niagara Falls. If a short circuit develops, it is desirable not to cut the two systems apart unless absolutely necessary. Assume 3% reactors of the usual air core type and 7% differential thermal reactors both in circuit, the latter having a time element of three seconds. When the short develops, the current is limited to thirty-three times full load by the air core reactors. If it persists, the differential thermal reactors will build up their magnetic resistance until at the end of three seconds, the current will be reduced to ten times full load. In this way, the selective equipment will have time to isolate the part in trouble without cutting the two systems apart and the current flowing into the short will be reduced, not all at once, but more and more up to a predetermined time limit. When the short went off, the 3% reactance would disappear at once but the 7% would go off gradually as the coils cooled and thus prevent a sudden redistribution of the load on the two systems.

A differential-thermal coil constructed according to my invention may be made to replace a fuse. The drop at normal load through the coils is only the resistance drop. On overload, the drop builds up and the reduced voltage available notifies the user that he has an overload connected. On short circuit, the drop would build up rapidly and limit the current. In this way, the current would not be entirely cut off at all and full service would be automatically resumed, when the overload or short circuit went off, or as soon thereafter as the coil cooled.

Reactance coils or magnetic resistances are used in A. C. arc welding to limit the current. The arc is so unstable that direct current motor generator sets with automatic regulation are employed. If a differential-thermal coil with very low time element is employed, it will automatically regulate to compensate for the varying arc voltage. I may also use the coil of my invention as a "loading coil" of variable impedance on telegraph or telephone circuits to introduce time characteristics or to compensate for varying impedance of such circuits with temperature.

I may employ the device of my invention in series with appliances such as radio sets as a voltage regulator. Increased current flowing to the set would introduce heating in the coils and increase the inductive drop, pulling the voltage across the set down. A coil of this type may be used in place of a moving core type regulator in a series lighting circuit to keep the current approximately constant. It may be used as a maximum demand controller in connection with electricity supply. If the amount of current contracted for were exceeded, it would operate to reduce the voltage in a much larger ratio than the increase in current. In some cases, the usual meter can be dispensed with and the coil alone be used, where the billing is at a flat rate independent of use below a certain maximum. It may be used as a voltage regulator on light and power circuits.

To illustrate in part what is meant by the statement "I may employ a set of opposed equal windings according to my invention herein", Figs. 1, 2 and 8, as shown in application Ser. No. 416,877 are reproduced herein, as Figs. 4, 5 and 6.

Under "objects of the invention" application Ser. No. 416,877 states:

A still further object of my invention is to provide a plural winding electromagnetic system in which the magnetic effect is controlled by a differential change in resistance in the electromagnetic windings in accordance with a predetermined time cycle.

Still another object of my invention is to provide an electromagnetic system constituted by a multiplicity of windings each having different temperature coefficients of resistance for differentially acting upon said electromagnetic system and predetermining the magnetic properties thereof over a definite time cycle.

These "objects" in the original disclosure indicate in part the scope of the original invention and are to be considered in connection with the following "objects of the invention" as applied in a power distribution system.

Another object of my invention is to provide a construction of electromagnet reactor or transformer in which the rise and fall of the magnetic characteristics thereof may be made to conform with a predetermined time period.

One of the objects of my invention is to produce a current limiting impedance coil for power distribution systems wherein the inductive reactance develops relatively slowly over a time period under short circuit conditions.

Another object of my invention is to produce a current limiting slow reactance coil for power distribution systems wound on a core of magnetic material.

Still another object of my invention is to produce a power distribution system including current limiting reactors of both instantaneous and slow acting types.

A further object of my invention is to produce a power distribution system including at least one slow type reactor in series with an instantaneous type reactor.

A still further object of my invention is to produce a power distribution system with slow type reactors between the generators and the bus.

Another object of my invention is to produce a power distribution system with slow type reactors between one part of the bus and another part of the bus.

Still another object of my invention is to produce a power distribution system with slow type reactors between the bus and the outgoing feeders to the load.

A still further object of my invention is to produce a power distribution system including a current limiting impedance whose inductive reactance is substantially zero at normal loads of the circuit in which it is connected, but rises over a predetermined time cycle during continuance of short circuit currents.

A further object of my invention is to provide a current limiting impedance which develops part of its total inductive reactance instantaneously on short circuit currents and part subsequently over a time period.

Other and further objects of my invention reside in the apparatus more fully described in the following specification by reference to the accompanying drawings, in which:

Figure 1 is a diagrammatic sketch showing the slow impedance device of my invention and connections thereof; Fig. 2 is a schematic diagram of a power distribution system with slow impedance devices connected in various parts thereof; Fig. 3 shows switching means connected in the circuit of Fig. 1; Fig. 4 is a cross-sectional view taken through one form of the device of my invention, the said view being a reproduction of Fig. 1 of my application S. N. 416,877; Fig. 5 is a cross-sectional view taken through a construction of a modified form of device embodying my invention, the said view corresponding to Fig. 2 of my application S. N. 416,877; and Fig. 6 is a wiring diagram showing the electrical circuit connections embodied in the forms of my invention shown in Figs. 4 and 5, the said view being a reproduction of Fig. 8 of my application S. N. 416,877.

The method of operation of my slow impedance device is more fully described in the parent case and is briefly described herein in order to make the invention clear. Two windings are connected in parallel, in effective inductive opposition and the magnetic coupling causes the two windings to produce a resultant magnetic condition dependent on the relative ampere-turns of the two windings. Disproportionate changes in resistance of the windings, or of resistors in series with the windings, with variations in the temperature of the windings or their series resistors, change the relative ampere-turns and thus the magnetism and inductive reactance of the coil.

It will thus be seen that the inductive reactance of my slow impedance device may be made to vary over a time period under the control of the designer of the coil, whereas a current limiting coil of the usual air core single winding type has an inductive reactance which appears practically instantaneously upon the application of current.

The time element involved in the production of slow magnetism and inductive reactance in my current limiting impedance device is an inherent feature of its constitution and requires no auxiliary apparatus such as time relays, switches, etc., to make it effective.

Referring to the drawings in detail, Figure 1 shows the arrangement of the coils 1 and 2 on the core 3, and the conductors 4 to connect the device in circuit.

Fig. 2 is a one line connection diagram showing the slow devices of my invention disposed throughout a power supply system. Generators at 6, 7, 8 and 9, feed through slow impedance devices 10, 11, 12 and 14, respectively, into two busses. Generators 6 and 7 feed into bus 16 and generators 8 and 9 into bus 17. A bus tie impedance device 22 connects the two groups of generators. Other slow impedance devices 18, 19, 20 and 21 are disposed in the separate feeder lines which lead from the busses 16 and 17. Any of these devices may be instantaneous reactors and the remainder, the slow impedance devices of my invention. It may prove desirable to have the feeder reactors 18, 19, 20 and 21 of the instantaneous type, or to employ a combination of types in some positions.

In power houses, impedance devices are ordinarily installed between generators and the main busses to protect the generators against short circuits; in the busses themselves to localize short circuits; and between the busses and outgoing feeders to protect the generating station against outside short circuits. Very large impedance devices are also used to protect one generating system against short circuits originating in a second system to which it is connected.

One usual arrangement in distribution systems is to employ reactors which limit short circuit currents to 20 or 33 times full load, called 5% or 3% reactors respectively. It will thus be seen that the short circuit currents are tremendous as compared with operating currents, and unless a large amount of iron is used in an instantaneous type reactor, the core will be saturated long before the maximum short circuit current value is reached, rendering the iron of little use at the point it is most needed. For this reason, air core coils are ordinarily employed for the purpose.

In the impedance device of my invention, the net magnetomotive force effective to set up magnetism is the difference between the magnetomotive forces of two opposing windings. With complete interlinkage of flux between the two windings, and with the opposed magnetomotive forces equal, there will be no net magnetism and no inductive reactance. If a given pair of windings produce zero magnetism with normal current in the circuit, they will still produce zero magnetism if the currents rise proportionately in the two windings, even though to short circuit proportions. As the windings in the device of my invention heat, the resistances of the two windings will change disproportionately, altering the ratio of the currents and producing net magnetism of an amount depending on the degree of unbalance.

It will thus be seen that the amount of magnetism and consequent inductive reactance is not a function of the current value as in an instantaneous type reactor, but is dependent on the change in resistance of the windings with temperature and may, therefore, be varied at the will of the designer.

A magnetic material core may, therefore, be used with slow impedance devices, since the value of the net magnetomotive force is not a function of the current, but may be made to follow a curve from zero to full excitation closely approximately that used in transformers and other electrical devices ordinarily equipped with magnetic material cores. The use of a core is advantageous in reducing the overall size of the coils, in more efficient production of magnetism, in reducing problems created by the intense magnetic fields around air core reactors on short circuit current, and in controlling magnetic leakage.

In a slow impedance device, magnetic leakage between opposed windings produces a net inductive reactance which varies more or less in proportion to the total current, i. e., leakage flux fuctions to make a reactor an instantaneous type, whereas interlinked flux functions to make it a slow type. If the reactor in the above illustration started with a magnetic unbalance, due to unequal ampere-turns in the windings, the unbalance would be present, highly intensified, under short circuit conditions. I may utilize either means, i. e., leakage or unbalance, to produce in a single device, both instantaneous and slow reactance. A predetermined percentage of its total inductive reactance would appear instantly on short circuit, and the balance would be manifested gradually as the windings heated. It will thus be possible to have one coil function to hold the short circuit current down, for instance, to 33 times full load as an instantaneous reactor, and then gradually lower the current to 20 times full load at the end of two seconds.

By using wire of small cross-section, in proportion to the short circuit current to be carried and designing for high temperature, the time element may be made short. By using wire of relatively large cross-section in proportion to the current, the time period may be made long.

Under some conditions, it may be desirable to use separate reactors in series, one reactor for setting up the instantaneous current limiting action, and a second reactor for setting up the current limiting action over a time period.

If a slow impedance device having two paralleled inductively coupled and opposed windings is operating under load and one of the two windings is disconnected or open circuited, the winding remaining in circuit will function as an instantaneous type reactor. I may, therefore, arrange to have the same reactor function alternately as a slow or instantaneous type by switching means connected in series with one of the two windings. Fig. 3 shows such a switching means at 23 which may be manually or automatically controlled.

The windings of my slow reactor may be formed of materials having different temperature coefficients of resistance, with positive, negative, or zero coefficient materials in either winding. Or I may include separate resistance elements in series with the windings, elements having different temperature coefficients of resistance and acting to alter the current division in the two windings with change in temperature of the elements.

The slow electromagnetic regulating devices I employ in a power distribution system to control and limit abnormal or short circuit currents therein, may assume any of the forms illustrated and described in application S. N. 416,877, for Slow electromagnet, of which this is a continuation-in-part.

Figs. 4, 5 and 6 more fully explain my invention, from which it will be seen that windings 1 and 2 may be supported as a twin conductor on suitable supporting spool 24 on terminals brought out at 4—4 as shown in Figs. 1 and 2, or winding 1 may be supported on spool 25 and winding 2 may be supported on spool 26, mounted in adjacent positions as shown in Fig. 5. In each instance the supporting spools 24, 25, or 26 are provided with core receiving openings through which magnetic core 27 may be adjusted. As shown in Fig. 8 the windings 1 and 2 form circuits 1 and 2 which are electrically connected in parallel and coupled in opposition.

While I have described my invention in certain of its preferred embodiments, I desire it to be understood that modifications may be made and that no limitations upon my invention are intended other than may be imposed by the scope of the appended claims.

What I claim as new and desire to secure by Letters Patent of the United States is as follows:

1. A power distribution system including in series therewith a current limiting impedance device, the inductive reactance of said impedance device varying over a time period after increase in current, said device comprising two parallel connected inductively coupled and opposed windings constituted by materials having different temperature coefficients of resistance, and producing changes in magnetism and inductive reactance with changes in temperature of the windings by reason of disproportionate changes in resistance of the two windings thereof.

2. A power distribution system including in series therewith a current limiting impedance device, the inductive reactance of said impedance device varying over a time period after increase in current, said device comprising two windings connected in parallel and in effective inductive opposition, said windings formed of materials having substantially different temperature coefficients of resistance.

3. A power distribution system including in series therewith a current limiting impedance device, the inductive reactance of said impedance device varying over a time period after increase in current, said device comprising two windings connected in parallel and in effective inductive opposition, one of said windings formed of material having a positive temperature coefficient of resistance and the other of said windings formed of material having a negative temperature coefficient of resistance.

4. A power distribution system including in series therewith a current limiting impedance device, the inductive reactance of said impedance device varying over a time period after increase in current, said device comprising two windings connected in parallel and in effective inductive opposition, one of said windings formed of material having a positive temperature coefficient of resistance and the other of said windings formed of material having substantially zero temperature coefficient of resistance.

5. A power distribution system including in series therewith a current limiting impedance device, the inductive reactance of said impedance device varying over a time period after increase in current, said device comprising two windings connected in parallel and in effective inductive opposition, one of said windings formed of material having a negative temperature coefficient of resistance and the other of said windings formed of material having substantially zero temperature coefficient of resistance.

6. A power distribution system including in series therewith a current limiting impedance device, the inductive reactance of said impedance device varying over a time period after increase in current, said device comprising two windings connected in parallel and in effective inductive opposition, said windings formed of materials having substantially different temperature coefficients of resistance, said windings wound on a core of magnetic material.

7. A power distribution system including in series therewith a current limiting impedance device, the inductive reactance of said impedance device varying over a time period after increase in current, said device comprising two windings connected in parallel and in effective inductive opposition, said windings formed of materials having substantially different temperature coefficients of resistance, said windings wound on a core of magnetic material proportioned to contain the magnetic flux produced at the maximum magnetic condition after rated short circuit current has been applied for the rated time period of the device.

8. A current limiting impedance device for connection in a power distribution system, said impedance device comprising two windings connected in parallel and in effective inductive opposition, said windings formed of materials having substantially different temperature coefficients of resistance, and switching means in series with one of the two windings for disconnecting it while the second winding remains in the circuit.

9. In a power distribution system, a power network, a plurality of generators connected with parts of said power network, a bus interconnecting the parts of said power network, and a bus tie reactor disposed between the parts of said network, said reactor comprising two inductively coupled and opposed windings connected in parallel one with respect to the other and constituted by materials having different temperature coefficients of resistance, said parallels subject to disproportionate changes in the currents in the two windings thereof with changes in temperature for varying the inductive reactance of said reactor over a time period and limiting short circuit currents in said bus tie.

10. In a power distribution system, a generator, a bus, a current limiting impedance device connected in series between said generator and said bus to limit short circuit currents between generator and said bus, said impedance device comprising two inductively coupled and opposed windings connected in parallel one with respect to the other and formed of materials having different temperature coefficients of resistance.

11. In a power distribution system, a generator, a bus, a load feeder connected to said bus, a current limiting impedance device connected in series between said feeder and said bus to limit short circuit currents between said feeder and bus, said impedance device comprising two inductively coupled and opposed windings connected in parallel one with respect to the other and formed of materials having different temperature coefficients of resistance.

12. A power distribution system including a generator, bus, feeder, load circuit and reactors for limiting short circuit currents in said system, each of said reactors comprising two inductively coupled and opposed windings connected in parallel one with respect to the other and constituted by materials having different temperature coefficients of resistance, each of said reactors subject to disproportionate changes in current in the two windings thereof with changes in temperature, for increasing the inductive reactance of the reactor over a time period under short circuit conditions.

13. A power distribution system including a generator, bus, feeder, load circuit, and an impedance device, said impedance device having substantially zero inductive reactance at all loads up to full load of the circuit in which said device is connected, the inductive reactance of said impedance device increasing over a predetermined time period under short circuit conditions for progressively decreasing the short circuit current, said impedance device including two parallel connected, inductively coupled and opposed windings, said windings being substantially magnetically balanced at normal current and unbalanced magnetically after heating under short circuit conditions, said unbalance being effected by disproportionate changes in resistance of the two windings thereof, said windings constituted by materials having different temperature coefficients of resistance.

14. A power distribution system including in series therewith a current limiting device, said device comprising two inductively coupled and opposed windings connected in parallel and arranged for substantially complete flux interlinkage, said windings constituted by materials having different temperature coefficients of resistance to disproportionately change in resistance with temperature, the inductive reactance of said device varying with increase in current over a time period, from zero at normal current and substantially zero magnetism upward to a maximum at short circuit current and maximum magnetism.

15. A power distribution system including in series therewith a current limiting device, comprising two inductively coupled and opposed windings connected in parallel and constituted by materials having different temperature coefficients of resistance, said windings arranged for incomplete flux interlinkage to produce a definite inductive reactance drop at normal current, said drop increasing substantially instantaneously with increase in current, said device producing increased inductive reactance over a time period after said increase in current, by reason of disproportionate changes in resistance with temperature of said windings, said increased reactance further increasing said reactance drop without further increase in current.

16. A power distribution system including in series therewith a current limiting device, said device comprising two inductively coupled and opposed windings connected in parallel and arranged for substantially complete flux interlinkage, said windings constituted by materials having different temperature coefficients of resistance to disproportionately change in resistance with temperature, the inductive reactance of said device varying with increase in current over a time period, from zero at normal current and substantially zero magnetism upward to a maximum at short circuit current and maximum magnetism, said inductive reactance and magnetism decreasing to substantially zero over a time period after the short circuit is cleared.

17. A power distribution system including generators connected to load circuits through busses and feeders, impedance devices in series in the several parts thereof to limit excess currents therein, said impedance devices including at least one instantaneous type reactor and a slow impedance device in series, said slow impedance device arranged to develop its full rated inductive reactance after a predetermined overload current has been maintained through it for a predetermined time period, said slow impedance device comprising two windings connected in parallel and in effective inductive opposition, said windings formed of materials having substantially different temperature coefficients of resistance.

18. A power distribution system including in series therewith a current limiting device, comprising a pair of inductively coupled and opposed windings connected in parallel one with respect to the other and constituted by materials having different temperature coefficients of resistance, a movable core of magnetic material associated therewith; the changes in resistance with temperature of said windings, the movement of said core, and the changes in electromagnetic induction between said windings mutually cooperating to limit abnormal current flow in said distribution system, said limitation of current increasing over a time period controlled by the heating of said windings.

19. A power distribution system including generators connected to load circuits through busses and feeders, impedance devices in the several parts thereof to limit abnormal currents therein, each of said impedance devices comprising two inductively coupled and opposed windings connected in parallel one with respect to the other and constituted by materials having different temperature coefficients of resistance, a movable core of magnetic material associated therewith, the changes in resistance with temperature of said windings, the movement of said core, and the changes in electromagnetic induction between said windings mutually cooperating to alter the impedance of said device over a time cycle and limit abnormal currents therethrough.

20. A power distribution system including generators connected to load circuits through busses and feeders, impedance devices in the several parts thereof to limit abnormal currents therein, each of said impedance devices comprising a pair of inductively coupled and opposed windings connected in parallel one with respect to the other and constituted by materials having different temperature coefficients of resistance, the changes in resistance with temperature of said windings and the electromagnetic induction between said windings mutually cooperating to alter the impedance of said device over a time cycle and limit abnormal currents therethrough.

21. A power distribution system including generators connected to load circuits through busses and feeders, impedance devices in series in the several parts thereof to limit abnormal currents therein, each said impedance device comprising a core of magnetic material having a movable portion, a pair of inductively coupled and opposed windings on said core connected in parallel one with respect to the other and constituted by materials having different temperature coefficients of resistance, said impedance device as a whole functioning as a combined moving core electromagnet and impeder to limit abnormal currents in said distribution system by changes with time in the magnetism, impedance and electromagnetic induction between the windings of said device.

22. A power distribution system including impedance devices as in claim 21, wherein changes in temperature of said windings cause initial changes in magnetism, and movement of said core, changes in impedance and changes in the transformer action of said windings produce further magnetism changes over a time cycle.

23. A power distribution system including generators connected to load circuits through busses and feeders, impedance devices in the several parts thereof to limit abnormal currents therein, each of said impedance devices comprising two inductively coupled and opposed windings connected in parallel one with respect to the other, resistors in series with each of said windings within the parallel connection, said resistors constituted by materials having different temperature coefficients of resistance, a movable core of magnetic material associated with said windings, the changes in resistance with temperature of said resistors, the movement of said core, and the changes in electromagnetic induction between said windings mutually cooperating to alter the impedance of said device over a time cycle and limit abnormal currents therethrough.

24. A power distribution system including generators connected to load circuits through busses and feeders, impedance devices in the several parts thereof to limit abnormal currents therein, each of said impedance devices comprising a pair of inductively coupled and opposed windings connected in parallel one with respect to the other, resistors in series with each of said windings within the parallel connection, said resistors constituted by materials having different temperature coefficients of resistance, the changes in resistance with temperature of said resistors and the electromagnetic induction between said windings mutually cooperating to alter the impedance of said device over a time cycle and limit abnormal currents therethrough.

25. A power distribution system including in series therewith, a current limiting impedance device, said device having two parallel paths, the resistance of said paths varying disproportionately with temperature changes therein, a winding in each said path, said windings inductively coupled and opposed, said disproportionate resistance changes acting to vary the inductive reactance of said impedance device over a time period.

26. A power distribution system including in series therewith, a current limiting impedance device, said device having two parallel paths, means in at least one path to vary its resistance with temperature changes therein, the resistance of said paths varying disproportionately with temperature changes therein, a winding in each said path, said windings inductively coupled and opposed, said disproportionate resistance changes acting to vary the inductive reactance of said impedance device over a time period.

ALBERT B. RYPINSKI.